United States Patent
Cladiere et al.

(10) Patent No.: US 10,408,277 B2
(45) Date of Patent: Sep. 10, 2019

(54) TWIST-BREAKABLE MECHANICAL FUSE AND COOLING UNIT OF A TURBINE ENGINE FITTED WITH SUCH A FUSE

(71) Applicant: SAFRAN HELICOPTER ENGINES, Bordes (FR)

(72) Inventors: Mathieu Cladiere, Pau (FR); Armand Bueno, Assat (FR); Olivier Pierre Descubes, Nay (FR); Stephane Vergez, Aast (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 145 days.

(21) Appl. No.: 15/535,396

(22) PCT Filed: Dec. 7, 2015

(86) PCT No.: PCT/FR2015/053355
§ 371 (c)(1),
(2) Date: Jun. 12, 2017

(87) PCT Pub. No.: WO2016/097529
PCT Pub. Date: Jun. 23, 2016

(65) Prior Publication Data
US 2017/0343052 A1  Nov. 30, 2017

(30) Foreign Application Priority Data
Dec. 15, 2014 (FR) .................................. 14 62399

(51) Int. Cl.
*F02K 3/04* (2006.01)
*F16D 9/06* (2006.01)
(Continued)

(52) U.S. Cl.
CPC ............... *F16D 9/06* (2013.01); *F01D 21/00* (2013.01); *F01D 25/12* (2013.01); *F04D 29/263* (2013.01);
(Continued)

(58) Field of Classification Search
CPC .... F02F 1/004; F02F 1/18; F02F 7/007; F02F 7/0085; F02F 7700/00; F04D 29/263; F04D 29/266; F16D 9/06
(Continued)

(56) References Cited

U.S. PATENT DOCUMENTS

| | | | |
|---|---|---|---|
| 4,452,567 A * | 6/1984 | Treby | F01D 5/026 415/9 |
| 6,478,543 B1 | 11/2002 | Tuchscherer et al. | |
| 7,025,560 B2 * | 4/2006 | Clark | F01D 21/04 403/2 |
| 2003/0021691 A1 | 1/2003 | Powers | |
| 2004/0006967 A1 * | 1/2004 | Clark | F01D 21/04 60/223 |

(Continued)

FOREIGN PATENT DOCUMENTS

EP  1382805 A2  1/2004

OTHER PUBLICATIONS

International Search Report with English language translation, dated May 23, 2016, International Application No. PCT/FR2015/053355.
(Continued)

*Primary Examiner* — Marguerite J McMahon
(74) *Attorney, Agent, or Firm* — Womble Bond Dickinson (US) LLP

(57) ABSTRACT

The invention relates to a mechanical fuse intended to be rigidly mounted between a drive unit (8, 9), and a receiver unit (10), each rotating about the same axis (7) of rotation, said fuse comprising a body (13) extending in a longitudinal
(Continued)

Figure 1:
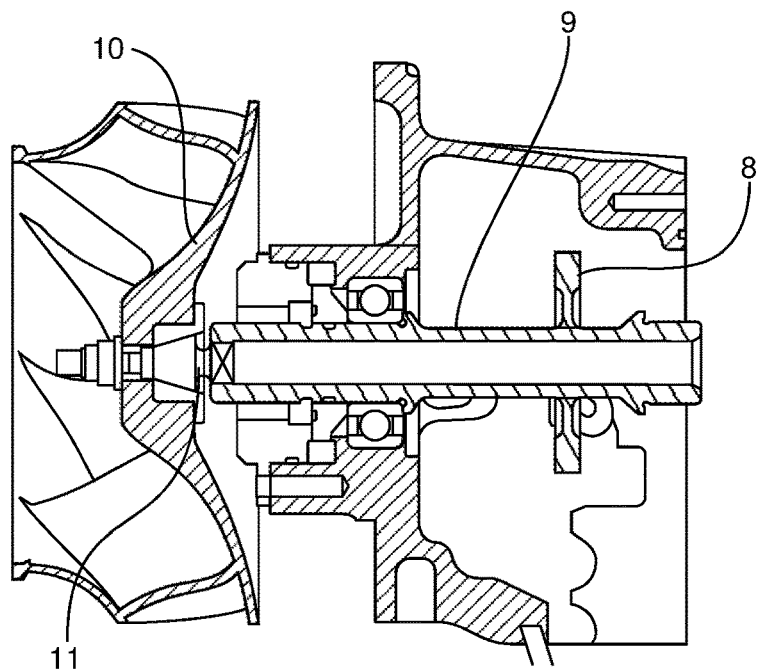

direction parallel to said axis (7) of rotation, once the fuse is mounted between said drive unit (8, 9) and receiver unit (10). The invention is characterized in that said body (13) comprises a plurality of longitudinal bars (14), each bar (14) being deformable by bending, such as to form a twist-breakable mechanical fuse.

10 Claims, 2 Drawing Sheets

(51) Int. Cl.
*F04D 29/26* (2006.01)
*F01D 21/00* (2006.01)
*F01D 25/12* (2006.01)
(52) U.S. Cl.
CPC .... *F05D 2260/20* (2013.01); *F05D 2260/311* (2013.01)

(58) Field of Classification Search
USPC .......................................................... 416/2, 9
See application file for complete search history.

(56) References Cited

U.S. PATENT DOCUMENTS

| | | | |
|---|---|---|---|
| 2005/0186861 A1 | 8/2005 | Powers | |
| 2010/0135770 A1* | 6/2010 | Durocher | F01D 9/065 |
| | | | 415/69 |
| 2012/0275921 A1* | 11/2012 | Steen | F01D 5/025 |
| | | | 416/204 R |
| 2016/0305490 A1* | 10/2016 | Rix | F16D 47/02 |

OTHER PUBLICATIONS

Written Opinion of the International Searching Authority with English language translation cover sheet, dated May 23, 2016, International Application No. PCT/FR2015/053355.

* cited by examiner

TWIST-BREAKABLE MECHANICAL FUSE AND COOLING UNIT OF A TURBINE ENGINE FITTED WITH SUCH A FUSE

1. TECHNICAL FIELD OF THE INVENTION

The invention relates to a twist-breakable mechanical fuse. The invention also relates to a cooling unit of a turbine engine fitted with such a mechanical fuse.

2. TECHNOLOGICAL BACKGROUND

In many technical fields, in particular for aeronautical applications, it is often necessary to have couplings of mechanical shafts that may break when these couplings are subjected to torques consisting of opposing forces that exceed a predetermined value. This functionality makes it possible to protect the components downstream of these couplings. To do this, providing twist-breakable sections on the shaft lines is known. Such a twist-breakable section has the specific feature of being able to break when it is subjected to the action of a torque consisting of opposing forces above a predetermined value.

A known solution for forming a twist-breakable section on a shaft line involves using a solid shaft that has a local reduction in its diameter so that this part having a smaller diameter can break when the torque exceeds a predetermined value.

One of the drawbacks of this solution is that, when the breakable section breaks, it is necessary to replace the entire shaft, which, for some applications, requires dismantling all the components connected to the shaft. This is particularly the case with cooling units of turbine engines. A cooling unit comprises a pinion and an impeller mounted in cantilever on the shaft carrying the pinion. If the breakable section formed on the shaft by local reduction in the diameter breaks, it is necessary to remove the impeller and the reducer module connected to the cooling unit in order to be able to replace the drive shaft. This makes maintaining and replacing such a breakable section complicated and not very practical to implement.

Furthermore, if the maximum torque is relatively low, which is the case for example with cooling-unit impellers, the breakable section may be small, which may impose significant installation constraints (in order not to stress said breakable section) and operating constraints (dynamics of the shaft line, movement under maneuvering loads).

Another solution for providing a twist-breakable section on a shaft line involves using a hollow shaft having a local reduction in material on its internal or external wall. This solution still has the drawbacks of the previous solution. In addition, the sizing for the breakage torque of this solution gives thicknesses that are too small to be properly controlled.

Another solution involves shrinking one mechanical component onto the other and controlling the sliding force. One of the drawbacks of this solution is the difficultly in properly controlling the sliding in the operating temperature range of the components concerned. This drawback makes this solution particularly unsuited to turbine-engine cooling units.

There is therefore a need to have an improved solution for providing a twist-breakable section in a mechanical coupling of components in a turbine engine. Such a need is expressed in particular, but not solely, for uses in turbine-engine cooling units.

In particular there is a need to have a solution that allows a replacement of this breakable section without any particular difficulties and in particular without requiring complete dismantling of the mechanical components affected by this coupling.

3. OBJECTIVES OF THE INVENTION

The invention aims to overcome at least some of the drawbacks of the known solutions for providing twist-breakable sections in mechanical couplings in a turbine engine.

The invention also aims, in at least one embodiment of the invention, to provide a breakable section that is intrinsically more robust in respect of assembly and bending stresses.

The invention aims to provide, in at least one embodiment of the invention, a breakable section that can be replaced by an operator without any particular difficulties.

The invention also aims to provide a cooling unit equipped with a breakable section according to the invention.

4. DISCLOSURE OF THE INVENTION

To do this, the invention relates to a mechanical fuse intended to be rigidly mounted in a turbine engine between a driving mechanical member, referred to as a driving member, and a driven mechanical member, referred to as receiving member, each turning about the same axis of rotation.

The fuse according to the invention comprises a body extending in a longitudinal direction parallel to said axis of rotation, once the fuse is mounted between said driving and receiving members.

The fuse according to the invention is characterised in that said body comprises a plurality of longitudinal bars, each bar being suitable for being deformed under bending, under the action of a torsional moment applied to all the bars, so as to form a breakable mechanical fuse.

The invention therefore proposes a novel solution for providing a twist-breakable section in a coupling of mechanical members in a turbine engine. This solution involves using a mechanical fuse that is an insert that will interconnect the two mechanical members. This insert can therefore be replaced in the event of breakage of the breakable section. This mechanical fuse has the specific feature of comprising a plurality of bars each deformable by bending under the action of a torsional moment. This set of bars provided longitudinally in the axis of rotation of the mechanical members connected by this fuse forms a twist-breakable fuse. In other words, the resistance to torsion of the fuse depends on the resistance to bending of the bars. A fuse according to the invention makes it possible to increase bending stiffness, which reduces sensitivity to imbalance. In other words a fuse according to the invention makes it possible to form a twist-breakable section that is less likely than the breakable sections of the prior art to break in an unsuitable manner.

Furthermore, a fuse according to the invention allows an improved sizing of the breakable section through the determination of the number of bars, the length of the bars, the width of the bars, the thickness of the bars, the cross section of the bars and, in general terms, all the dimensional and geometric characteristics of the bars.

Advantageously, a mechanical fuse according to the invention comprises means for the reversible coupling of the fuse to said driving member, which means are arranged at a longitudinal end of said body, referred to as the distal end.

Advantageously and according to the invention, said distal end of said body has a cylindrical portion or a conical portion, adapted to a cylindrical or conical portion of said driving member. These portions form the reversible coupling means.

A conical or cylindrical connection between the mechanical fuse and the driving member makes it possible to provide a minimum eccentricity, which makes it possible to limit the imbalance in the receiving member. In particular, when the mechanical fuse according to this variant is used as a connecting part between a pinion of a cooling unit and an impeller mounted in cantilever on the pinion by means of the mechanical fuse, the conical connection forms a balancing reference. This makes it possible to guarantee that the connection between the pinion and the impeller can be repeated identically during each assembly.

Advantageously, a fuse according to the invention comprises means for the reversible coupling of the fuse to said receiving member, which means are arranged at a longitudinal end of said body, referred to as the proximal end.

Advantageously and according to the invention, said proximal end of said body comprises an attachment plate suitable for being attached to said receiving member. This attachment plate forms the reversible coupling means.

The assembly and disassembly of a mechanical fuse according to this variant is therefore particularly easy. Furthermore, in the context of a use on a turbine-engine cooling unit, the fuse can be dismantled and replaced without it being necessary to dismantle the reducer of the unit in particular.

Advantageously and according to the invention, the body is hollow,

A hollow body makes it possible in particular to dispense with the attachment elements at the centre of the body. The use of bars makes it possible to keep thicknesses of material easily machinable and of which the dimensions make it possible to control the breakage torque range of the breakable section. These attachment elements comprise for example a nut or a screw that is received in the hollow body as far as the distal end of the fuse. These attachment elements contribute to the assembly of the fuse on the driving member, in connection with the conical portions.

Advantageously and according to this variant, the mechanical fuse comprises a strut suitable for being received in said hollow body through said proximal end and for being able to place said conical portion of the distal end in abutment on said conjugate conical portion of said drive member.

The use of a strut makes it possible to limit the inside diameter of the mechanical fuse and facilitates access to the attachment elements of the screw/nut type. Furthermore, this abutment of the conical portion of the distal end on the conical portion of the driving member makes it possible to provide the rotational driving of the receiving member by the driving member by means of the mechanical fuse.

Advantageously and according to this variant, said strut has a shoulder that makes it possible to limit the axial movement of said receiving member in the event of mechanical breakage of the fuse.

A shoulder provided on the strut makes it possible to block the axial movement of the receiving member in the event of breakage of the breakable section formed by the mechanical fuse.

According to another variant, the mechanical fuse comprises a screw received directly in said hollow body in order to place said conical portion of the distal end in abutment on the conjugate conical portion of said driving member.

Advantageously and according to the invention, the body is cylindrical and the fuse comprises three bars distributed uniformly around said body.

Naturally, according to other variants, the mechanical fuse may comprises more than three bars.

The invention also relates to a cooling unit of a turbine engine comprising a drive shaft and an impeller mounted in cantilever on said shaft, characterised in that it comprises a mechanical fuse according to the invention.

The invention also relates to a mechanical fuse and a cooling unit of a turbine engine, characterised in combination by all or some of the features mentioned above or below.

5. LIST OF FIGURES

Figure 2:
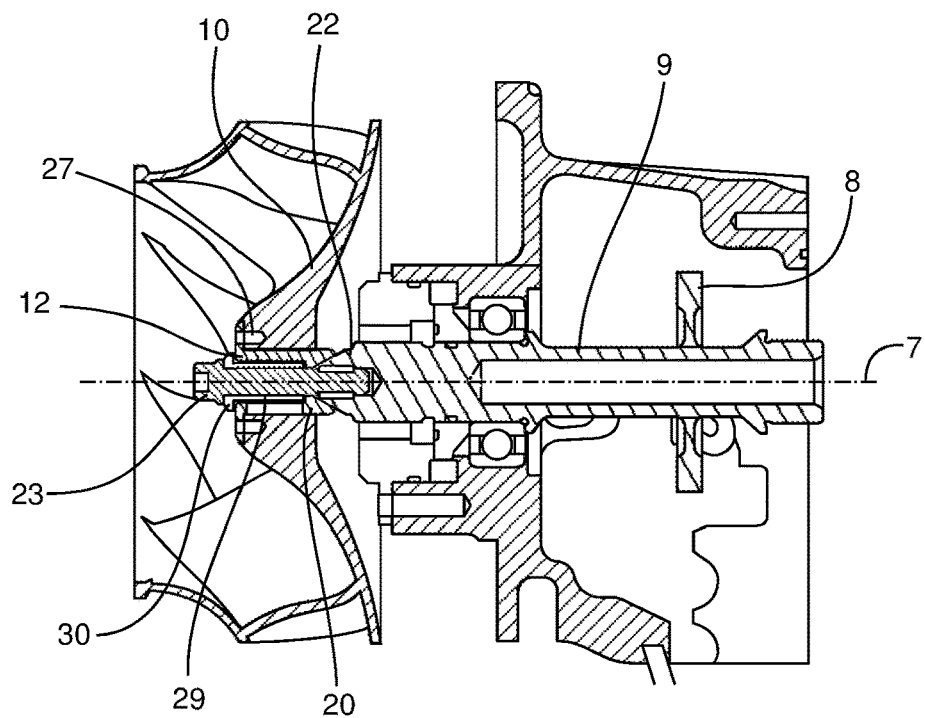
Figure 3:
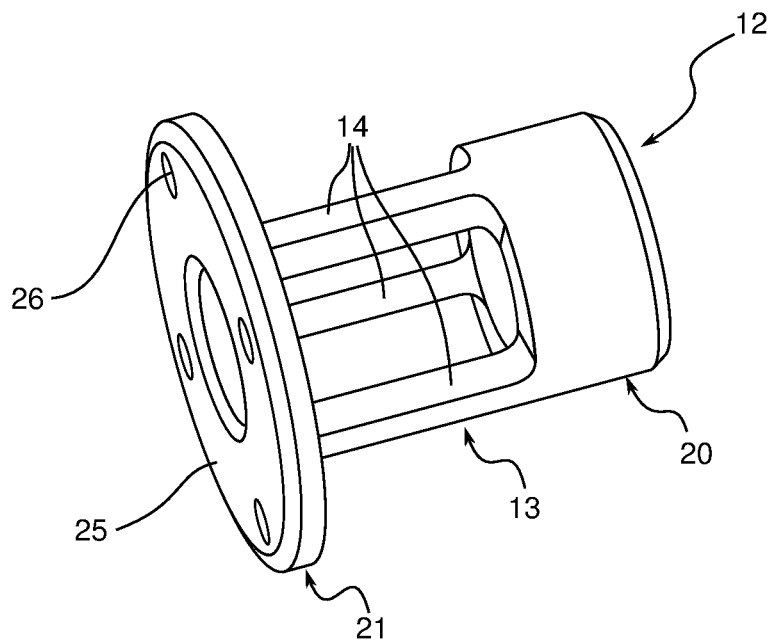
Figure 4A:
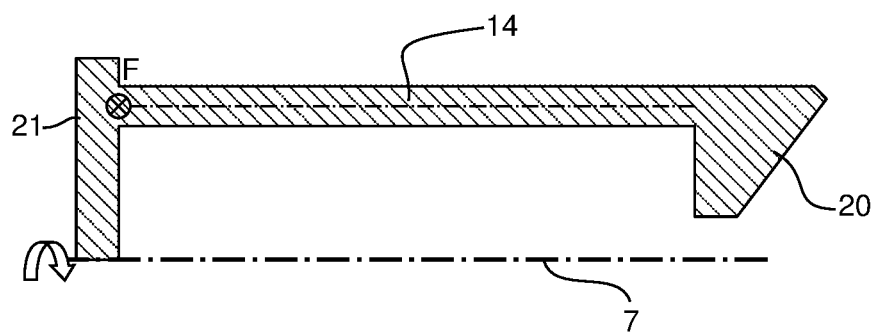
Figure 4B:
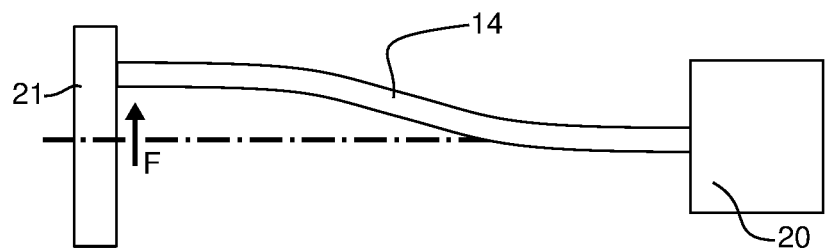

Other aims, features and advantages of the invention will emerge from a reading of the following description given solely non-limitatively and which refers to the accompanying figures, in which:

FIG. 1 is a schematic view in cross section of a cooling unit of a turbine engine according to the prior art comprising a driving shaft, an impeller mounted in cantilever on this shaft and a twist-breakable section formed by a reduction in diameter of the drive shaft, FIG. 2 is a schematic view in cross section of a cooling unit of a turbine engine according to an embodiment of the invention comprising a driving shaft, an impeller mounted in cantilever on this shaft, and a twist-breakable section formed by a mechanical fuse according to an embodiment of the invention, FIG. 3 is a perspective view of a mechanical fuse according to an embodiment of the invention, FIGS. 4a and 4b are schematic views respectively in cross section and plan view of a bar of a mechanical fuse according to an embodiment of the invention.

6. DETAILED DESCRIPTION OF AN EMBODIMENT OF THE INVENTION

In the figure, the scales and proportions are not strictly respected, for purposes of illustration and clarity. Throughout the detailed description that follows with reference to the figures, unless indicated to the contrary, each element of the mechanical fuse is described as arranged when the fuse is mounted in a cooling unit of a turbine engine, between the driving pinion of the unit and the impeller of the cooling unit mounted in cantilever on the pinion. This arrangement is shown in FIG. 2.

A cooling unit of the prior art is shown partially in FIG. 1. This cooling unit comprises a pinion 8 mounted on a shaft 9 and an impeller 10 mounted in cantilever on the shaft 9. The pinion 8 and the shaft 9 are formed in a single piece so that, throughout the following description, indifferently, the pinion 8 or shaft 9 are used to designate the assembly formed by the pinion 8 and the shaft 9. This mechanical coupling between the shaft 9 and the impeller 10 comprises a twist-breakable section 11, formed by a reduction in the diameter of the shaft 9. This breakable section is typically achieved by a local reduction in the diameter of the shaft 9 to approximately 5 mm.

It is clear from FIG. 1 that, if the breakable section 11 breaks, it is necessary to replace the shaft 9. Furthermore, to access the shaft 9, it is necessary to remove the mechanical members connected upstream of this pinion, such as a reducer, not shown in the figures for purposes of clarity, and the impeller 10.

FIG. 2 is a schematic view of the same cooling unit in which the breakable section 11 has been replaced by a mechanical fuse 12 according to an embodiment of the invention. The shape of the impeller 10 and the shape of the shaft 9 have been slightly modified to allow mounting of the mechanical fuse according to the invention.

In particular, this mechanical fuse comprises a hollow body 13, a distal end 20 configured so as to be placed in abutment against one end of the shaft 9, and a proximal end 21 configured so as to be connected to the impeller 10.

To do this, the distal end 20 comprises an internal conical portion (this conical portion can be seen in FIG. 2) that is adapted to a conical portion 22 provided at the end of the shaft 9. Furthermore, a screw 23 can be received in the hollow body 13 through the proximal end 21 in order to be able to rigidly attach the mechanical fuse 12 and the shaft 9. To do this, the conical portion 22 of the shaft 9 has a threaded bore suitable for receiving the screw 23.

The screw 23 and the conical portions 20, 22 form the means for assembling the fuse 13 on the shaft 9.

The proximal end 21 of the fuse comprises an attachment plate 25. This plate comprises four bores 26, each bore being able to receive a shrunk-on pin 27 for attaching the impeller 10 to the attachment plate. To do this, the impeller 10 also comprises bores arranged opposite the bores 26 in the attachment plate.

To facilitate the abutment of the conical portions, the fuse further comprises a strut 29 received in the body 13. This strut 29 is received through the proximal end of the mechanical fuse. This strut makes it possible to keep the conical portion 22 of the shaft 9 in abutment through the conical-shaped distal end 20 of the fuse. A radial clearance is provided between the strut 29 and the body 13 of the mechanical fuse 12 in order to avoid friction and to ensure breakage of the fuse at the required torque.

This strut 29 also has a shoulder 30 for limiting the axial movement of the impeller 10 in the event of mechanical breakage of the fuse. An axial clearance is also provided between the shoulder 30 of the strut 29 and the plate 25 of the mechanical fuse in order to prevent friction and ensure breakage of the fuse at the required torque.

The mechanical fuse according to the embodiment in the figures further comprises, as shown in more detail in FIG. 3, three longitudinal bars 14 uniformly distributed around the hollow body 13, each bar 14 being suitable for being deformed by bending. The bars 14 absorb the torque related to the driving of the impeller 10 by the pinion 8 and work by bending.

FIGS. 4a and 4b are schematic views of a bar 14 and of its deformation by bending. As can be seen, if a torque C is applied to the fuse, then each bar is subjected to a force F tangent to the hollow body 13. This force F is such that C=n.r.F, where r is the radius of the neutral fibre with respect to the axis 7 of rotation and n is the number of bars (in the present case, n=3). According to the theory of bi-embedded beams, the maximum bending moment M is defined by the equation M=F.L/2, where L is the length of a bar. FIG. 4b is a plan view of the bar 14 subjected to the force F. The bar deforms by bending. It is next possible to determine a breakage criterion for the bars when the value of the stress in the cross section of the beam is equal to the maximum stress whatever the region of the beam. This value depends on the plasticisation of the bar and the dispersion of the materials.

According to the embodiment in the figures, each bar 14 has a rectangular cross section, the length of which is 2.95 mm and the width of which is 2.9 mm. The neutral fibre is situated on a radius of 6.475 mm with respect to the axis 7 of the shaft. Furthermore, each bar has a length of 11.85 mm. Naturally, these dimensions are given solely by way of example and the invention is not limited solely to this embodiment. Calculations show, with bars made from stainless steel, a breakage torque range of 18.3 Nm to 40.5 Nm. Furthermore, experiments show that, under a radial force of 100 N, a bending stiffness of 15,453 N/mm is obtained, much better than the stiffness of 7545 N/mm of the prior art.

The invention is not limited solely to the embodiments described. In particular, a mechanical fuse may comprise more than three bars and equip couplings other than the couplings of a turbine-engine cooling unit.

The invention claimed is:

1. A mechanical fuse intended to be mounted securely in a turbine engine between a driving mechanical member, referred to as a driving member, and a driven mechanical member, referred to as a receiving member, each rotating about the same axis of rotation, said fuse comprising a body extending in a longitudinal direction parallel to said axis of rotation, once the fuse is mounted between said driving and receiving members,
    wherein said body comprises a plurality of longitudinal bars, each bar being suitable for being deformed by bending, under the action of a torsional moment applied to all the bars, so as to form a breakable mechanical fuse.

2. The fuse according to claim 1, wherein it comprises means for the reversible coupling of the fuse to said driving member, which means are arranged at a longitudinal end of said body, referred to as the distal end.

3. The mechanical fuse according to claim 2, wherein said distal end of said body has a conical portion or a cylindrical portion, which portion is adapted to a conical portion or a cylindrical portion of said driving member.

4. The fuse according to claim 1, wherein it comprises means for the reversible coupling of the fuse to said receiving member, which means are arranged at a longitudinal end of said body, referred to as the proximal end.

5. The mechanical fuse according to claim 4, wherein said proximal end of said body comprises an attachment plate suitable for being attached to said receiving member.

6. The mechanical fuse according to claim 1, wherein said body is hollow.

7. The mechanical fuse according to claim 3, wherein it comprises means for the reversible coupling of the fuse to said receiving member, which means are arranged at a longitudinal end of said body, referred to as the proximal, wherein said body is hollow, wherein it comprises a strut suitable for being received in said hollow body through said proximal end and for being able to place said conical portion of the distal end in abutment on said conjugate conical portion of said driving member.

8. The fuse according to claim 7, wherein said strut has a shoulder that makes it possible to limit the axial movement of said receiving member in the event of mechanical breakage of the fuse.

9. The fuse according to claim 1, wherein said body is cylindrical and in that it comprises three bars distributed uniformly around said body.

10. A cooling unit of a turbine engine comprising a driving shaft and an impeller mounted in cantilever on said shaft, wherein it comprises a mechanical fuse according to claim 1 that is arranged between said driving shaft and said impeller.

* * * * *